United States Patent
Liang et al.

(10) Patent No.: US 8,422,216 B2
(45) Date of Patent: Apr. 16, 2013

(54) MEMORY HOLDING APPARATUS

(75) Inventors: Zhi-Chun Liang, Shenzhen (CN); Fang Tian, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 359 days.

(21) Appl. No.: 12/960,353

(22) Filed: Dec. 3, 2010

(65) Prior Publication Data

US 2012/0127647 A1   May 24, 2012

(30) Foreign Application Priority Data

Nov. 21, 2000   (CN) .......................... 2010 1 0555116

(51) Int. Cl.
*G06F 1/16* (2006.01)

(52) U.S. Cl.
USPC ....... 361/679.31; 361/801; 439/325; 439/327

(58) Field of Classification Search ............. 361/679.31, 361/801–803; 248/316.4; 439/325, 327, 439/328
See application file for complete search history.

(56) References Cited

U.S. PATENT DOCUMENTS

| | | | | |
|---|---|---|---|---|
| 5,842,880 A | * | 12/1998 | Pei ............................... | 439/327 |
| 6,098,814 A | * | 8/2000 | Ma ................................ | 211/26 |
| 6,111,747 A | * | 8/2000 | Jeffries et al. ................. | 361/802 |
| 6,210,195 B1 | * | 4/2001 | Ma ............................... | 439/327 |
| 6,618,264 B2 | * | 9/2003 | Megason et al. ............. | 361/801 |
| 7,946,875 B2 | * | 5/2011 | Li et al. ......................... | 439/327 |
| 7,985,087 B2 | * | 7/2011 | Li et al. ......................... | 439/157 |
| 7,988,480 B2 | * | 8/2011 | Yao et al. ...................... | 439/329 |
| 8,007,303 B2 | * | 8/2011 | Yao et al. ...................... | 439/327 |
| 8,070,499 B2 | * | 12/2011 | Guan et al. .................... | 439/155 |
| 2009/0191736 A1 | * | 7/2009 | Guan et al. .................... | 439/135 |

* cited by examiner

*Primary Examiner* — Lisa Lea Edmonds

(74) *Attorney, Agent, or Firm* — Altis Law Group, Inc.

(57) ABSTRACT

A memory holding apparatus includes a main pole and an inserting pole. The main pole includes a main portion and a first holding portion perpendicularly extending from a first end of the main portion. A second end of the main portion defines a receiving hole extending to the first holding portion. A sidewall of the main portion defines an opening. An elastic blocking piece extends from a side bounding the opening. A hook extends from an inside wall of the blocking piece. The inserting pole includes an inserting portion and a second holding portion perpendicularly extending from a first end of the inserting portion. The inserting portion defines a groove from a second end of the inserting portion extending to the second holding portion. A number of blocks extend from a bottom of the groove. The hook is selectively engaged with one of the blocks.

10 Claims, 5 Drawing Sheets

MEMORY HOLDING APPARATUS

BACKGROUND

1. Technical Field

The present disclosure relates to a holding apparatus for holding memories inserted in memory slots of a motherboard.

2. Description of Related Art

When a motherboard is tested, a number of memories are inserted in memory slots of the motherboard to communicate with the motherboard. However, the motherboard may vibrate during testing and have bad connection with the memory slots.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
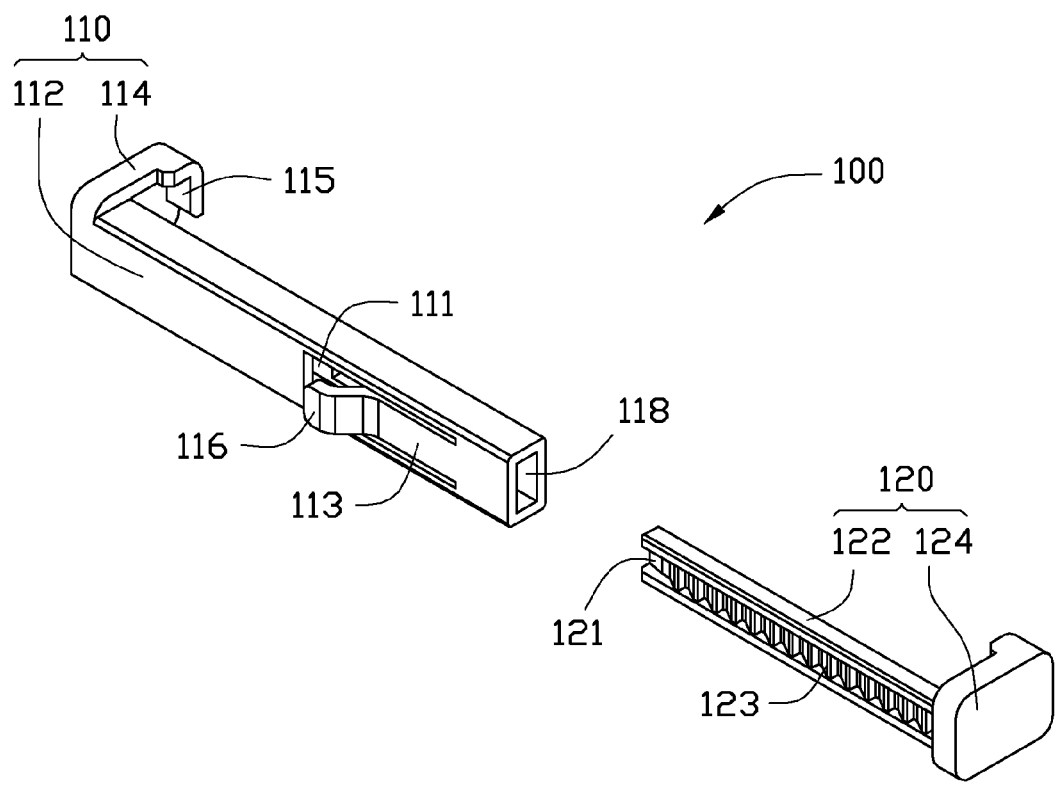
FIG. 1 is an exploded, isometric view of an embodiment of a memory holding apparatus.
Figure 2:
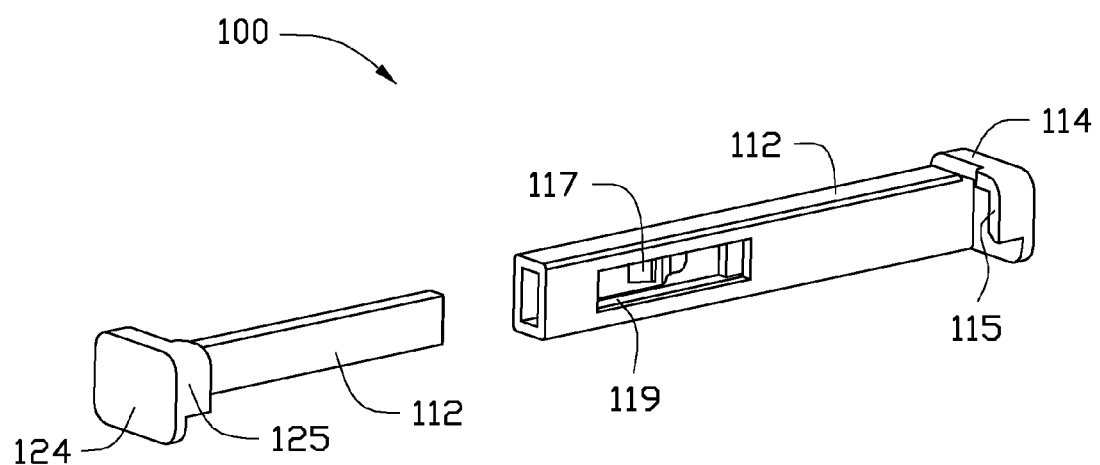
FIG. 2 is similar to FIG. 1, but viewed from another perspective.

Referring to FIGS. 1 and 2, an embodiment of a memory holding apparatus 100 includes a main pole 110 and an inserting pole 120.

The main pole 110 includes a substantially rectangular main portion 112 and a first holding portion 114 substantially perpendicularly extending from a first end of the main portion 112. A second end of the main portion 112 longitudinally defines a receiving hole 118 extending to the first holding portion 114. A substantially L-shaped first holding ear 115 substantially perpendicularly extends from a top of the first holding portion 114 toward the second end of the main portion 112. Two opposite sidewalls of the main portion 112 respectively define two substantially rectangular openings 111 and 119. The opening 119 is positioned at a same side as the first holding portion 114. An elastic blocking piece 113 extends toward the first end of the main portion 112 from a side bounding the opening 111 adjacent to the second end of the main portion 112, and a handle 116 extends out from a distal end of the blocking piece 113 adjacent to the first end of the main portion 112. A hook 117 extends from an inside wall of the blocking piece 113 opposite to the handle 116.

The inserting pole 120 includes a substantially rectangular inserting portion 122 and a second holding portion 124 substantially perpendicularly extending from a first end of the inserting portion 122. A substantially L-shaped second holding ear 125 substantially perpendicularly extends from a top of the second holding portion 124 toward a second end of the inserting portion 122 opposite to the first end. The inserting portion 122 defines a groove 121 in the second end of the inserting portion 122 extending to the second holding portion 124. A plurality of blocks 123 extends from a bottom of the groove 121.

Figure 3:
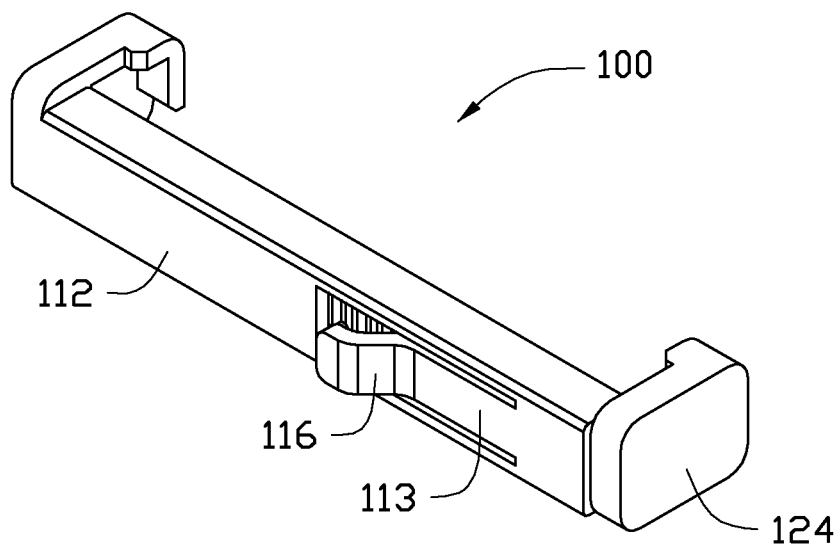
FIG. 3 is an assembled, isometric view of FIG. 1.

Referring to FIG. 3, in assembly, the inserting portion 122 of the inserting pole 120 is slidably inserted into the receiving hole 118 of the main pole 110, with the hook 117 of the main pole 110 engaging with one of the blocks 123. When the handle 116 is pulled out, the hook 117 disengages from the block 123, therefore the inserting pole 120 can be pulled out from the receiving hole 118 of the main pole 110.

Figure 4:
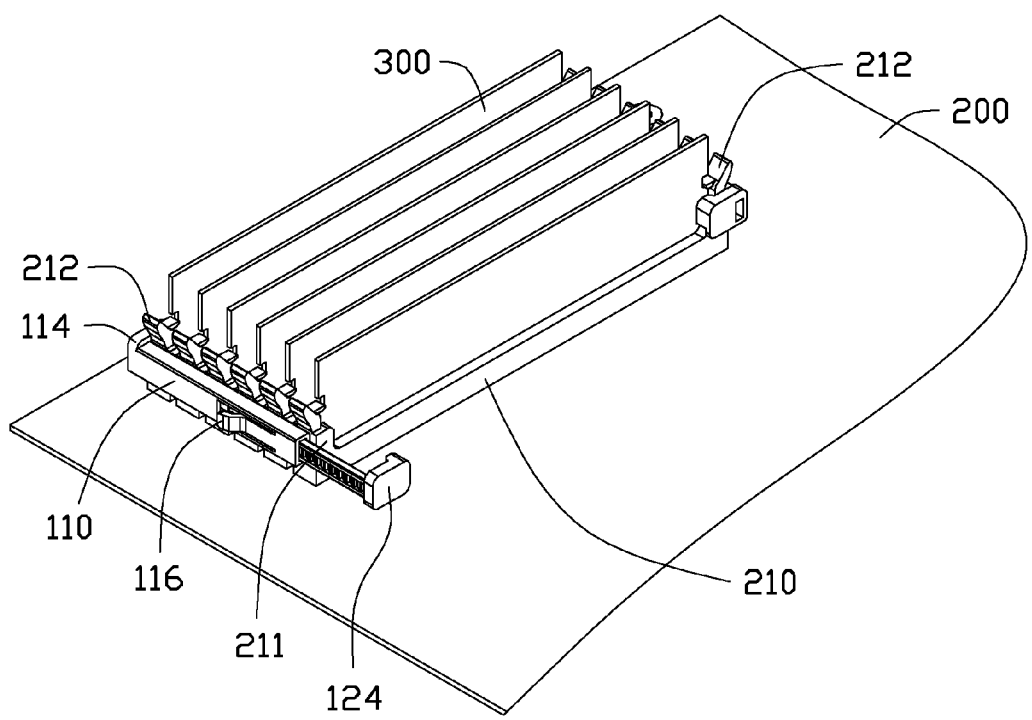
FIG. 4 is an isometric, schematic view of the memory holding apparatus of FIG. 3 holding memories of a motherboard.
Figure 5:
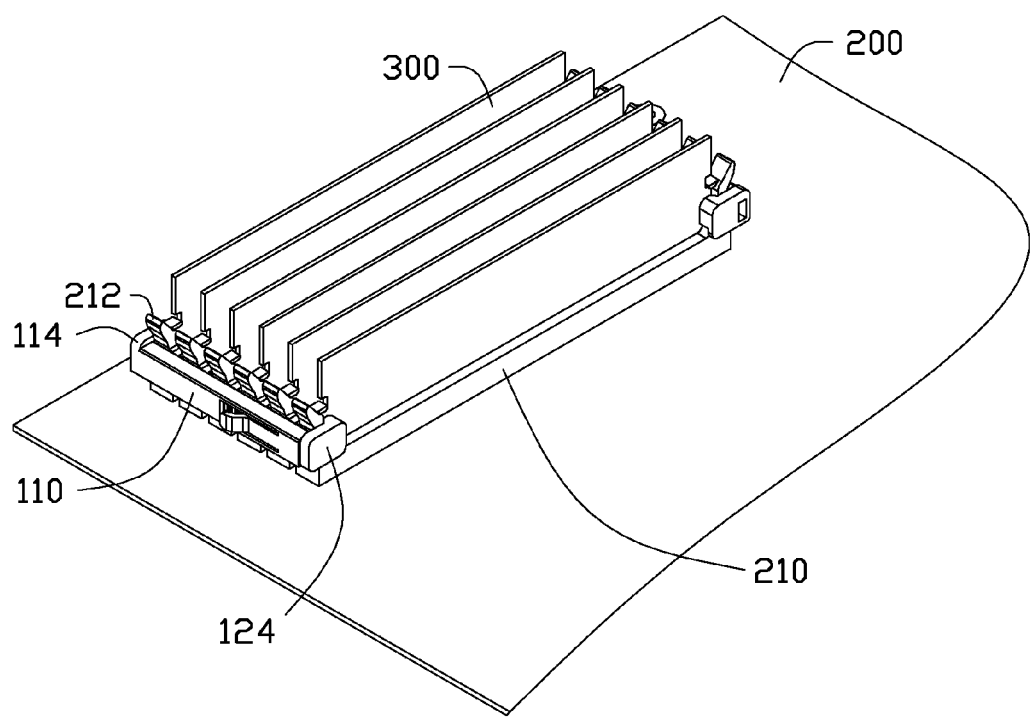
FIG. 5 is similar to FIG. 4, but in another state.

Referring to FIGS. 4 and 5, in use, the memories 300 are inserted into memory slots 210 of the motherboard 200, and positioned by positioning portions 212. A memory holding apparatus 100 of the disclosure is used to clamp first distal ends 211 of the memory slots 210 with the first and second holding ears 115 and 125. Another memory holding apparatus 100 is used to clamp second distal ends 211 of the memory slots 210 with the first and second holding ears 115 and 125. Therefore, the main portion 112 resists against the positioning portions 212, and prevents the memories 300 slipping or vibrating out of position.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A memory holding apparatus used to hold memories inserted in memory slots of a motherboard, the memory holding apparatus comprising:

a main pole comprising a main portion and a first holding portion substantially perpendicularly extending from a first end of the main portion, a second end of the main portion longitudinally defining a receiving hole extending to the first holding portion, a sidewall of the main portion defining an opening, an elastic blocking piece extending from a side bounding the opening, a hook extending from an inside wall of the blocking piece; and an inserting pole comprising an inserting portion and a second holding portion substantially perpendicularly extending from a first end of the inserting portion, the inserting portion defining a groove from a second end of the inserting portion extending to the second holding portion, a plurality of blocks extending from a bottom of the groove;

wherein the hook engages with one of the plurality of blocks in response to the inserting pole being inserted into the receiving hole of the main pole, with the first and second holding portions to clamp the memory slots.

2. The memory holding apparatus of claim 1, wherein the first holding portion and the second holding portion each comprise a substantially L-shaped holding ear to clamp the memory slots.

3. A memory holding apparatus used to hold memories inserted in memory slots of a motherboard, the memory holding apparatus comprising:

a main pole comprising a main portion and a first holding portion extending from a first end of the main portion; and an inserting pole comprising an inserting portion and a second holding portion extending from a first end of the inserting portion;

wherein a second end of the inserting pole is slidably mounted to a second end of the main portion, with a distance between the first and second holding portions being adjustable, thereby clamping the memory slots with the first and second holding portions.

4. The memory holding apparatus of claim 3, wherein the first holding portion and the second holding portion each comprise a holding ear to clamp the memory slots.

5. A motherboard assembly comprising:

a motherboard comprising a plurality of memory slots;

a plurality of memories inserted in the corresponding memory slots, and positioned by positioning portions; and a holding apparatus comprising a main pole and an inserting pole, the main pole comprising a main portion and a first holding portion extending from the main portion, the inserting pole comprising an inserting portion and a second holding portion;

wherein the inserting pole is slidably mounted to the main portion, with a distance between the first and second holding portions being adjustable, thereby clamping the memory slots with the first and second holding portions to make the main portion resist against the positioning portions, to prevent the memories slipping or vibrating out of the position.

6. The motherboard assembly of claim 5, wherein the first holding portion extends from a first end of the main portion, and the second holding portion extends from a first end of the inserting portion, a second end of the main portion is slidably mounted to a second end of the inserting portion.

7. The motherboard assembly of claim 6, wherein the second end of the main portion longitudinally defines a receiving hole, the inserting portion is slidably received in the receiving hole.

8. The motherboard assembly of claim 7, wherein a plurality of blocks extends from the inserting portion along the lengthwise direction of the inserting portion, a hook extends from the main portion into the receiving hole to engage with one of the plurality of blocks.

9. The motherboard assembly of claim 8, wherein the main portion defines an opening therein communicating with the receiving hole, an elastic blocking piece extends from a side bounding the opening, the hook extends from a distal end of the blocking piece.

10. The motherboard assembly of claim 9, wherein a handle extends from the distal end of the blocking piece, opposite to the hook.

\* \* \* \* \*